Patented Sept. 5, 1922.

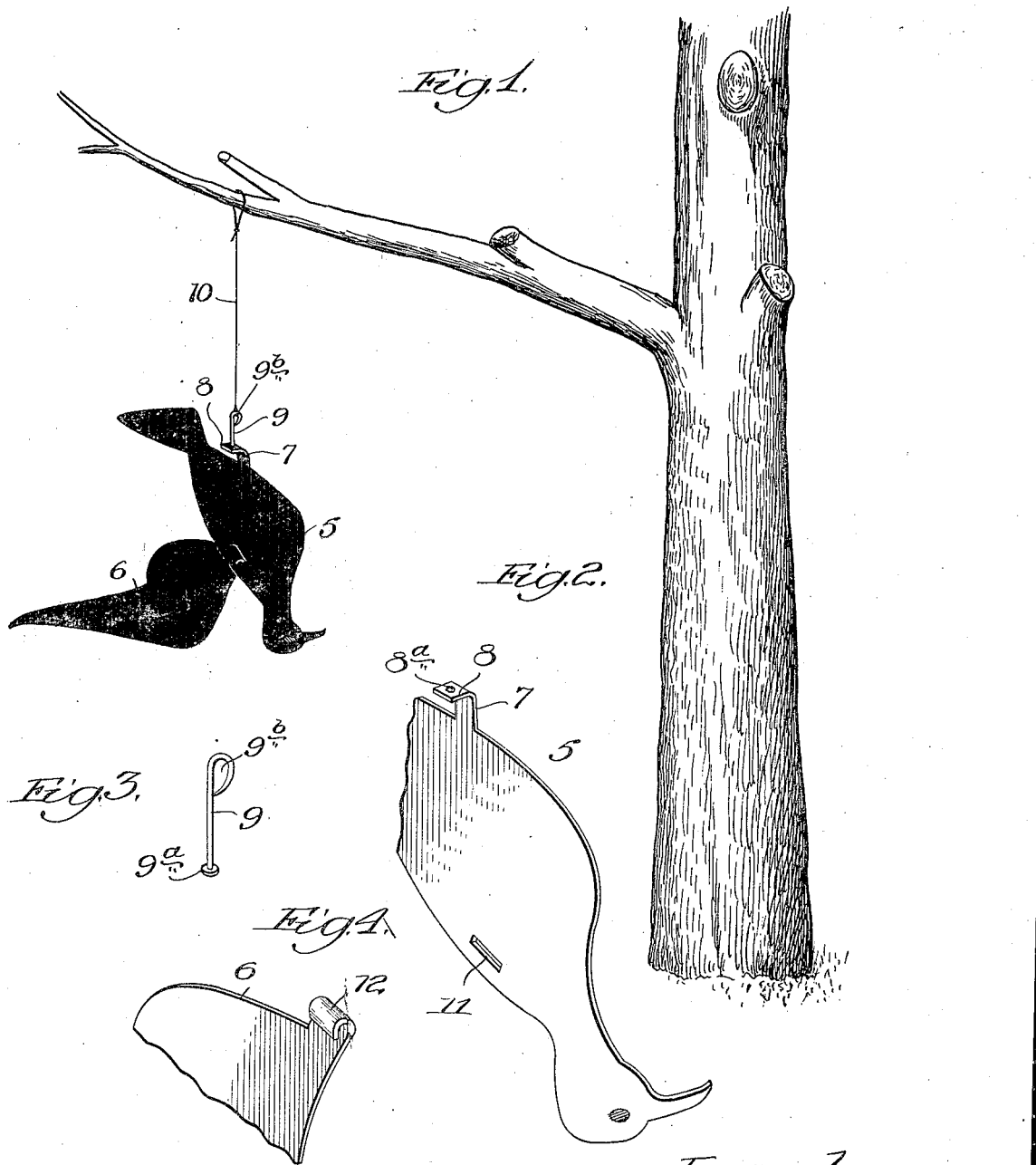

1,428,216

UNITED STATES PATENT OFFICE.

SAMUEL H. CHASE, OF MADISON, WISCONSIN.

SCARECROW.

Application filed August 17, 1921. Serial No. 492,879.

*To all whom it may concern:*

Be it known that I, SAMUEL H. CHASE, a citizen of the United States, residing at 1035 Woodrow, in the city of Madison, in the county of Dane and State of Wisconsin, have invented a new and useful Improvement in Scarecrows, of which the following is a specification.

My invention relates to certain new and useful improvements in scare-crows and is fully described and explained in the specification and shown in the accompanying drawing, in which:

Figure 1 is a perspective view representing a dummy-crow suspended in position for use from the branch of a tree; Figure 2 is a broken, perspective and enlarged view of the dummy (before being blackened); Figure 3 is a perspective view of a hanger-detail, and Figure 4 is a broken perspective view of a wing (before being blackened).

The dummy 5, which I prefer to cut or stamp out of sheet metal, has the shape of a crow and its two flat sides are painted black as is also the wing 6, as represented in Fig. 1, to augment the resemblance to that particular bird. A tongue is provided to project in proper position to represent a leg 7 and is bent at a right-angle, as shown, to resemble a foot 8, which is perforated at 8$^a$ to permit insertion through it of a hanger 9, which may be a wire nail to have its head 9$^a$ afford a stop, and having its pointed end bent into a loop 9$^b$ for attaching a wire 10, cord or the like, by which to suspend the device from a limb of a tree, as shown, or from some other suitable object. The body is slotted at 11 in position for attaching the wing 6, which is formed with a hook-like projection 12 for insertion through the slot to hinge the wing in place.

The dummy thus having the shape of a dead and mutilated crow, when hanging in a corn-field or other place attractive to crows, presents two flat surfaces whereby it is rendered visible from any angle to serve as a scare-crow; and when the dummy swings in the wind, it turns continually on the swivel afforded by the hanger 9 and renders the illusion the more complete.

The primary object of my invention is to protect grain-fields, and especially corn-fields, against crows, the appetite of this bird being particularly voracious for corn just sprouted, and farmers not infrequently are obliged, because of the ravages by crows, to replant entire fields of corn just after it has sprouted. Moreover, the crow destroys many birds' eggs and young birds which, if they had grown to maturity would be likely to destroy many more bugs and insects than the crow; and crows even rob nests of young chickens and turkeys while the old is off the nest, and they have been known to appear in pairs and also in groups of six or more and worry a setting turkey to attempt to fight them off, and while thus engaged with some of the group the others eat the eggs. In fact, while the crow deserves credit for the destruction of bugs and insects harmful to crops, the preponderance of its diet is decidedly on the side of produce which the farmer desires to raise. Furthemore, since the crow often feeds upon carrion, by going from place to place as is habitual with this bird, being thus in an unsanitary condition it carries to hogs the much-dreaded disease known as hog-cholera.

All this is recited by way of emphasizing the peculiar desirability of keeping crows in particular away from farms; and that result is best accomplished by a scare-crow resembling a dead crow for the following reasons:

Any other dummy bird or animal hung in simulating dead condition in place to afford a scare-crow attracts, instead of repelling the crow; because of its appetite for carrion; but a live crow, as experience has proven, will not venture near a dead crow, seeming to dread it as an ominous sign.

My dummy, being shaped and painted black to distinguish it as a crow from other birds, and hanging swayably suspended by one foot from a tree-branch (or maybe shrubbery, a wire fence, a post, or even a pole thrust into the ground and which should be inclined at a slight angle to sustain the weight) and with the hinged wing producing resemblance to a mutilated crow, so accentuates the appearance of a dead crow, particularly when swayed and rotated, as to frighten crows and deter them from alighting in any place where they see fit, as they do from all angles, whether stationary or rotating on the suspension-line under the force of wind when the swinging wing tends to continuously turn the dummy and render the illusion the more complete.

I realize that considerable variation is possible in the details of the construction herein shown, and I do not intend to limit myself thereto except as pointed out in the appended claims, in which it is my intention to claim all the novelty inherent in the device as broadly as permitted by the state of the prior art.

I claim:

1. A scare-crow comprising a dummy-crow having a hinged wing and provided with means including a foot extension by which to swingingly and rotatably suspend it in place for use.

2. A scare-crow comprising a flat-sided dummy-crow having a perforate foot extension and containing a slot in position for hinging a wing, a hanger in the foot-perforation for connection therewith of a suspending medium and forming a swivel-connection with the foot, and a wing provided with a hook-like extension insertible through said slot to hinge the wing in place.

3. In a scare-crow, a flat-sided figure shaped to resemble a crow, and means carried by said figure adapted for connection with supporting means to swingingly suspend the same in a head-downward inert position whereby to simulate a dead crow.

4. In a scare-crow, a figure shaped to resemble a crow, and means carried by said figure adapted for connection with supporting means to swingingly and rotatably suspend the same in a head-downward inert position whereby to simulate a dead crow.

5. In a scare-crow, a figure shaped to resemble a crow, a foot-extension carried by said figure adapted for connection with supporting means to swingingly and rotatably suspend the same in a head-downward inert position whereby to simulate a dead crow.

6. In a scare-crow, a figure shaped to resemble a dead crow, means carried by said figure adapted for connection with supporting means to swingingly and rotatably suspend the same, and a hinged wing member extending from said figure to cause the rotation thereof by the wind.

7. In a scare-crow, a figure shaped to resemble a dead crow, means carried by said figure adapted for connection with supporting means to swingingly and rotatably suspend the same, and a hinged wing member so connected to said figure as to extend downwardly and outwardly therefrom.

SAMUEL H. CHASE.